United States Patent
Neser

(10) Patent No.: US 11,842,516 B2
(45) Date of Patent: *Dec. 12, 2023

(54) HOMOGRAPHY THROUGH SATELLITE IMAGE MATCHING

(71) Applicant: UBICQUIA IQ LLC, Fort Lauderdale, FL (US)

(72) Inventor: Morné Neser, Montréal (CA)

(73) Assignee: Ubicquia IQ LLC, Fort Lauderdale, FL (US)

(*) Notice: Subject to any disclaimer, the term of this patent is extended or adjusted under 35 U.S.C. 154(b) by 6 days.

This patent is subject to a terminal disclaimer.

(21) Appl. No.: 17/745,784

(22) Filed: May 16, 2022

(65) Prior Publication Data

US 2022/0277544 A1  Sep. 1, 2022

Related U.S. Application Data

(63) Continuation of application No. 17/033,545, filed on Sep. 25, 2020, now Pat. No. 11,334,756, which is a (Continued)

(51) Int. Cl.
*G06V 10/75* (2022.01)
*G06T 3/00* (2006.01)
(Continued)

(52) U.S. Cl.
CPC .............. *G06T 7/74* (2017.01); *G06T 3/0012* (2013.01); *G06T 7/20* (2013.01); *G06V 10/243* (2022.01);
(Continued)

(58) Field of Classification Search
CPC ........... G06T 7/74; G06T 3/0012; G06T 7/20; H04N 5/2628
See application file for complete search history.

(56) References Cited

U.S. PATENT DOCUMENTS 8,531,519 B1 *  9/2013  Peng .................. H04N 7/18
                                                    382/190
8,938,091 B1     1/2015  Anguelov et al.
(Continued)

FOREIGN PATENT DOCUMENTS

CN        105118303 A      12/2015
WO        2017012470 A1     1/2017

OTHER PUBLICATIONS

Hamid Aghajan, Andrea Cavallaro, "Multi-Camera Networks," Apr. 25, 2009, 1st Edition, pp. xxi-xxvii, 435-480, ISBN-13: 978-0123746337, Academic Press, Burlington, MA, U.S.A.
(Continued)

*Primary Examiner* — Zaihan Jiang
(74) *Attorney, Agent, or Firm* — Daniel C. Crilly

(57) ABSTRACT

A system includes an imaging device configured to capture image data of a monitored area and a computing device having at least one processor. The computing device processor is configured to receive first image data from the imaging device and second image data from a satellite imagery system, where the second image data relates to the monitored area. The processor is also configured to determine a first set of points of interest in the first image data and a second set of points of interest in the second image data, wherein members of each set of points of interest are represented by a respective vector. The processor is further configured to generate a homography matrix based on the two vectors and determine, using the homography matrix, latitude and longitude coordinates of at least one object represented in the first image data but not the second image data.

20 Claims, 5 Drawing Sheets

Related U.S. Application Data continuation of application No. 16/352,880, filed on Mar. 14, 2019, now Pat. No. 10,817,747.

(51) Int. Cl.

| | | |
|---|---|---|
| *G06T 7/73* | (2017.01) | |
| *G06T 7/20* | (2017.01) | |
| *H04N 5/262* | (2006.01) | |
| *G06V 10/24* | (2022.01) | |
| *G06V 10/44* | (2022.01) | |
| *G06V 20/10* | (2022.01) | |
| *G06V 20/54* | (2022.01) | |

(52) U.S. Cl.
CPC ............ *G06V 10/44* (2022.01); *G06V 20/182* (2022.01); *G06V 20/54* (2022.01); *H04N 5/2628* (2013.01); *G06T 2207/10016* (2013.01); *G06T 2207/10032* (2013.01); *G06T 2207/30196* (2013.01); *G06T 2207/30232* (2013.01); *G06T 2207/30236* (2013.01); *G06T 2207/30264* (2013.01)

(56) References Cited

U.S. PATENT DOCUMENTS

| | | | | |
|---|---|---|---|---|
| 2013/0128121 A1* | 5/2013 | Agarwala | ............ | G11B 27/031 348/E5.077 |
| 2014/0147052 A1* | 5/2014 | Arcese | ................ | G06V 20/176 382/218 |
| 2014/0257943 A1* | 9/2014 | Nerayoff | ................. | G06T 7/292 382/104 |
| 2015/0279182 A1* | 10/2015 | Kanaujia | .......... | G08B 13/19608 382/103 |
| 2016/0078759 A1* | 3/2016 | Nerayoff | .............. | G08G 1/0175 701/3 |
| 2016/0232411 A1* | 8/2016 | Krishnamoorthy | ... | G06F 3/0482 |
| 2016/0307047 A1* | 10/2016 | Krishnamoorthy | .......................... | G06Q 30/0185 |
| 2016/0343003 A1* | 11/2016 | Howe | ................. | G06Q 30/0201 |
| 2017/0236284 A1* | 8/2017 | Elliethy | ................... | G06T 7/33 382/294 |
| 2018/0115751 A1 | 4/2018 | Noone | | |
| 2018/0174453 A1 | 6/2018 | Hohenacker | | |
| 2018/0240341 A1 | 8/2018 | Hetz et al. | | |
| 2018/0364546 A1* | 12/2018 | Harris | .................... | H04N 7/183 |
| 2019/0295216 A1* | 9/2019 | Suitoh | ..................... | G06T 5/006 |

OTHER PUBLICATIONS

World Intellectual Property Office, International Search Report and Written Opinion for International Application No. PCT/US2019/066123, dated Apr. 13, 2020, 10 pages.

World Intellectual Property Office, International Preliminary Report on Patentability for International Application No. PCT/US2019/066123, dated Aug. 25, 2021, 8 pages.

\* cited by examiner

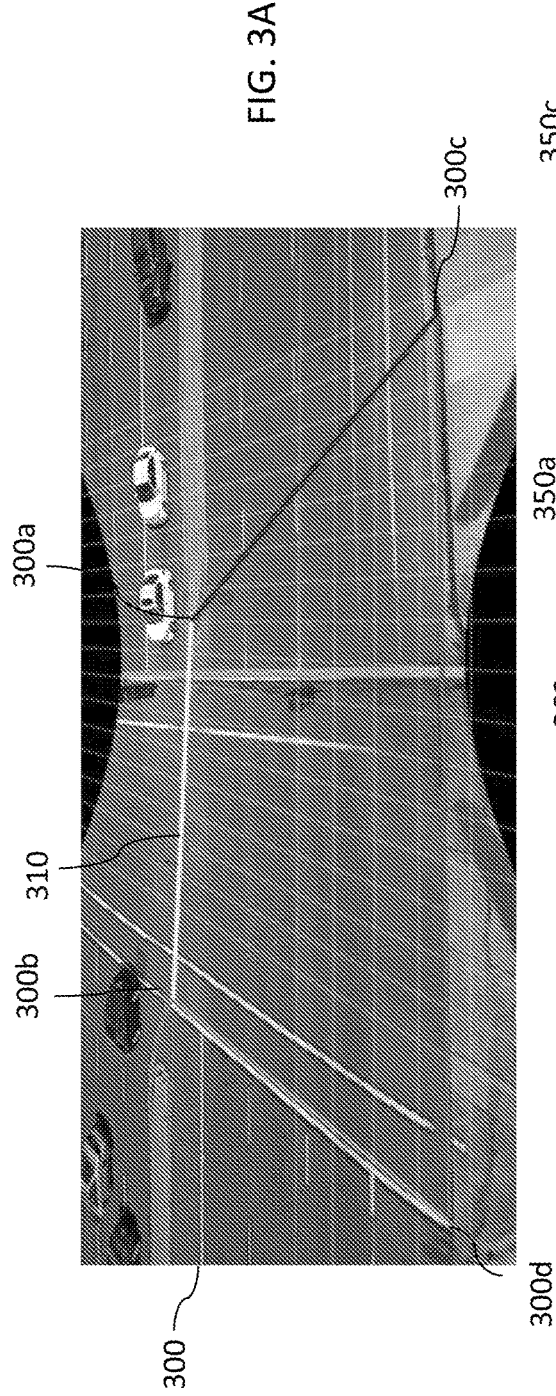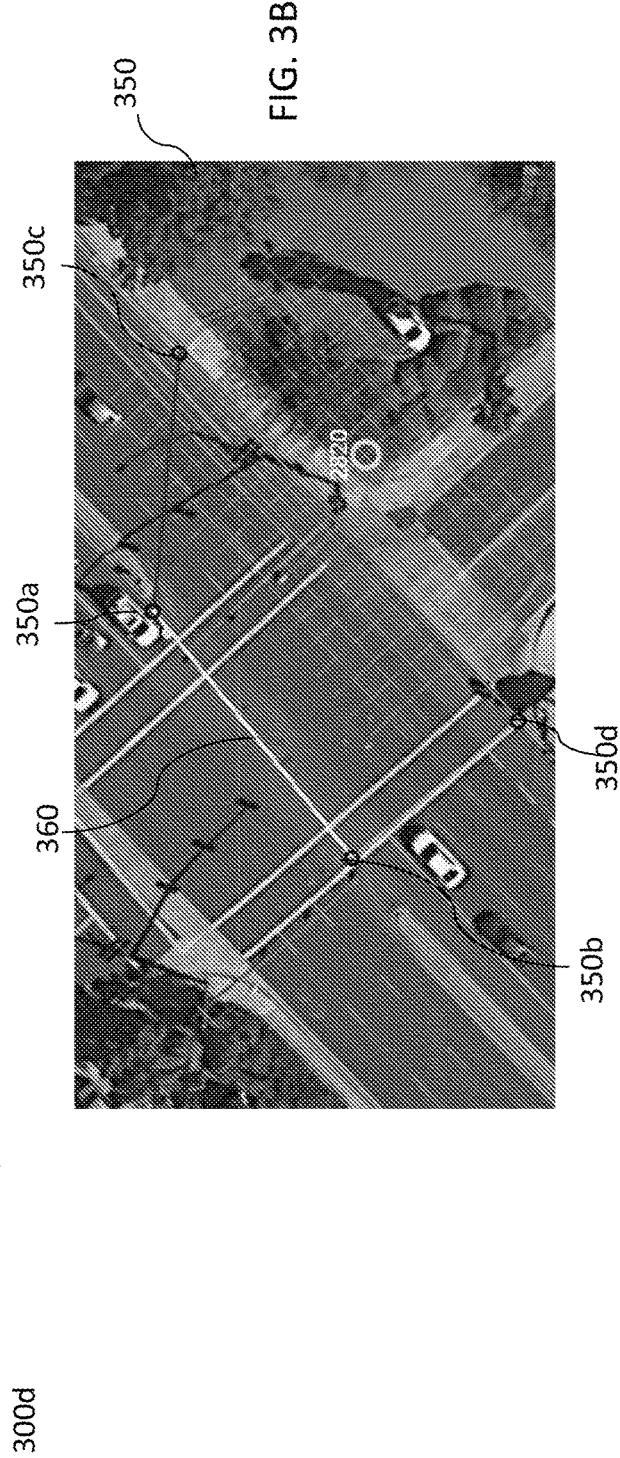

HOMOGRAPHY THROUGH SATELLITE IMAGE MATCHING

CROSS-REFERENCE TO RELATED APPLICATIONS

The present application is a continuation of U.S. application Ser. No. 17/033,545, now U.S. Pat. No. 11,334,756, which was filed on Sep. 25, 2020, and is incorporated herein by this reference in its entirety. U.S. application Ser. No. 17/033,545 is a continuation of U.S. application Ser. No. 16/352,880, now U.S. Pat. No. 10,817,747, which was filed on Mar. 14, 2019, and is incorporated herein by this reference in its entirety.

TECHNICAL FIELD

The present invention relates generally to optimizing homography of custom image data through satellite image matching. In particular, the present invention relates to matching camera image data to satellite image data using image analytics techniques to derive an image-to-location transform.

BACKGROUND

In present-day systems (e.g., traffic monitoring systems, parking systems, etc.) cameras and image analytics are used to determine actions to be taken to prevent problems and improve system operations.

For example, in a parking system, cameras and image analytics can be used to determine whether there are any vacant parking spaces, whether a vehicle has been stolen or a vehicle is parked illegally. In this situation, several still images and videos of different angles or areas of the parking system can be captured. The image analytics therefrom are reviewed to determine parking availability, theft or illegal parking.

However, the currently available images do not provide users with latitude and longitude data. Therefore, unnecessary time and costs can be incurred.

It is desirable to have a system capable of comparing a camera view and a satellite view of the same area and determining a homography matrix in order to determine latitude and longitude coordinates of objects observed.

SUMMARY

Given the aforementioned deficiencies, needed is a system and method for comparing an image from a camera view captured at a lighting fixture and a satellite view of the same area, and determining a homography matrix in order to determine latitude and longitude coordinates of objects observed, and capable of transforming the perspective of the camera image into a top-down view for mapping purposes.

In embodiments of the present invention, a system is provided. The system includes an imaging device to be disposed in a lighting fixture to capture images, a remote computing device in communication with the imaging device and comprising at least one processor. The processor is capable of processing data related to images from the at least one imaging device and from a satellite imagery system, performing comparison operation by detecting a first set of points of interest in an image from the at least one imaging device and corresponding second set of points of interest in an image of a same area from the satellite imagery system, and calculating a homography matrix by matching the first set of points of interests in the image from the at least one imaging device and the second set of points of interest in the image from the satellite imagery system, to determine latitude and longitude coordinates of the image from the imaging device.

Other embodiments provide a method to perform a comparison operation of images from an imaging device to images of a satellite imagery system to calculate a homography matrix using the above-identified system.

The foregoing has broadly outlined some of the aspects and features of various embodiments, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

BRIEF DESCRIPTION OF THE DRAWINGS

FIGS. 3A and 3B are perspective views of a same area via the image device of the system in FIG. 1 and the satellite imagery system that can be implemented within embodiments of the present invention.

Figure 1:
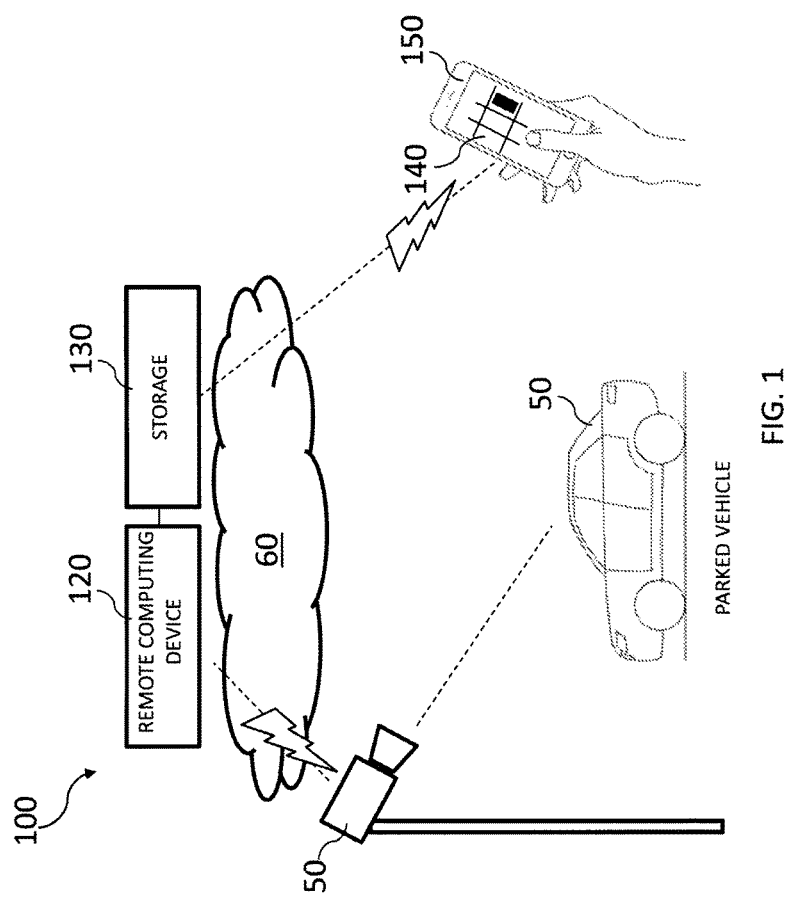
FIG. 1 is a schematic illustrating a parking and traffic system implementing a system for determining a homography matrix from image data of at least one image device and a satellite imagery system, in accordance with one or more embodiments of the present invention.

The drawings are only for purposes of illustrating preferred embodiments and are not to be construed as limiting the disclosure. Given the following enabling description of the drawings, the novel aspects of the present disclosure should become evident to a person of ordinary skill in the art. This detailed description uses numerical and letter designations to refer to features in the drawings. Like or similar designations in the drawings and description have been used to refer to like or similar parts of embodiments of the invention.

DETAILED DESCRIPTION

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale, and some features may be exaggerated or minimized to show details of particular components.

In other instances, well-known components, apparatuses, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

In homography through satellite image matching, "satellite image" is any top-down geographical mapping imagery obtained from high altitude vehicle (e.g., airplane or satellite).

As noted above, the embodiments provide a system and method for comparing an image from a camera view captured at a lighting fixture, and a satellite view of the same area, and determining a homography matrix in order to determine latitude and longitude coordinates of objects observed, and capable of transforming the perspective of the camera image into a top-down view for mapping purposes.

The method can be performed within an imaging device (e.g., a camera device) within a lighting system or over a communication network between the camera device within a lighting fixture and an external system. The communication network can be a network such as Wi-Fi, Internet, Bluetooth, 802.11, 802.15 and cellular networks. A system 100 according to embodiments of the present invention will now be discussed with reference to FIGS. 1 and 2.

Figure 2:
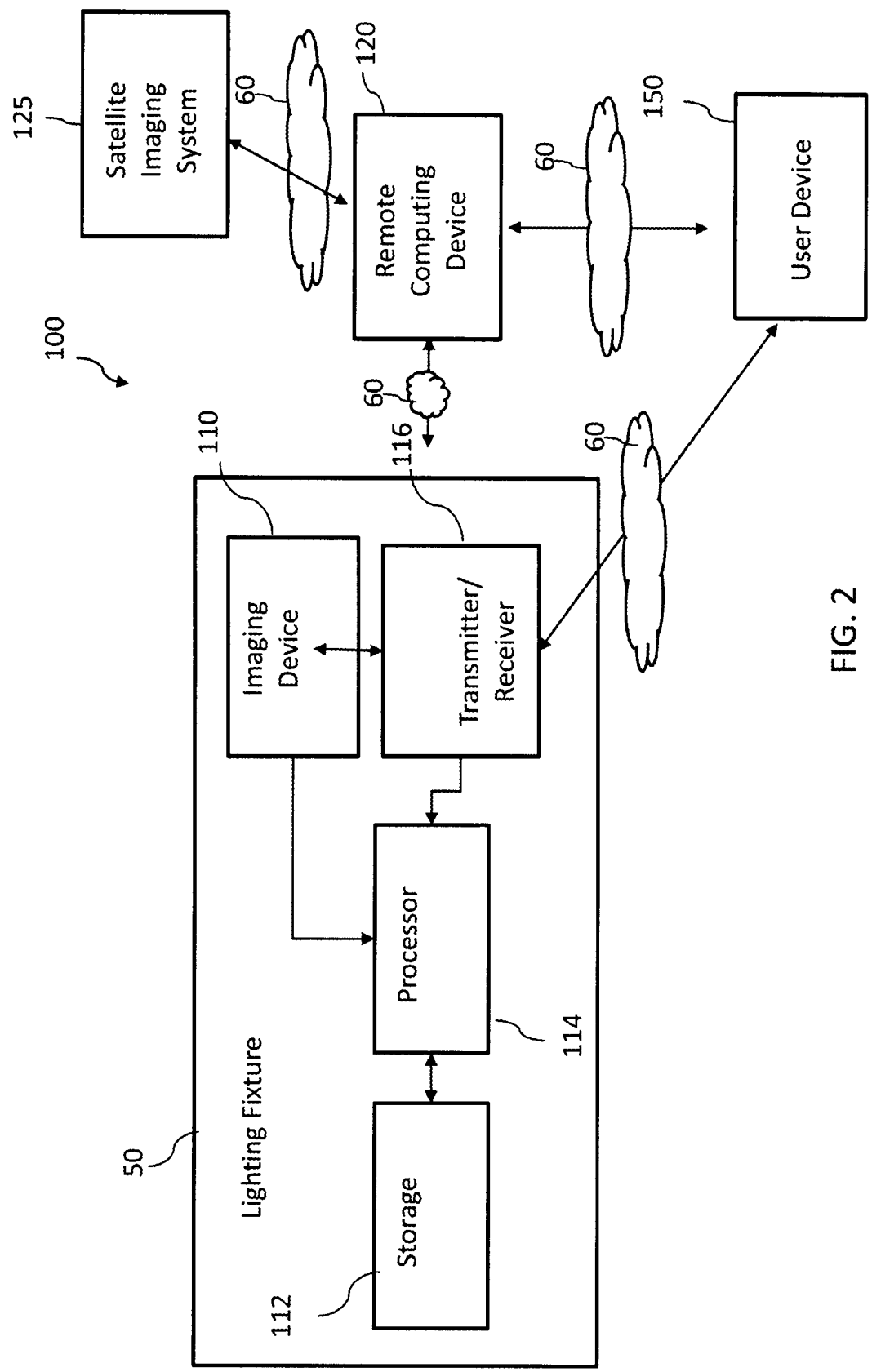
FIG. 2 is a block diagram illustrating the system as shown in FIG. 1 that can be implemented within one or more embodiments of the present invention.

As shown in FIGS. 1 and 2, the system 100 includes an imaging device 110, a storage device 112, a processor 114, a transmitter/receiver 116, to be deployed within a lighting fixture 50. The system 100 further includes a remote computing device 120, a storage medium 130 and a software module application 140 is accessible by a user device 150.

The lighting fixture 50 is typically disposed as a streetlight a predetermined distance from vehicles (e.g., a parked vehicle 55). The system 100 can be implemented within existing streetlight fixtures, or any other suitable parking monitoring systems to perform the methods of embodiments of the present invention. According to an embodiment of the present invention, a plurality of imaging devices 110 can be provided for monitoring pedestrian and vehicle traffic and parking in different directions.

The imaging device 110 can be a camera or other type of imaging device capable of detecting and capturing images of objects (e.g., the parked vehicle 55) and points of interest in its field of view. The images can be time-stamped and recorded for future processing.

The processor 114 receives the images captured by the imaging device 110 and processes the data locally using image analytics. Based on the processing operation, object detection occurs and objects such as vehicles and pedestrians are found. The processor 114 can be a microprocessor, a dual-core processor or any processor suitable for the purpose set forth herein.

The processed image data is then stored in the storage 112 or transmitted via the transmitter/receiver 116 to the remote computing device 120 (e.g., a server), for further remote processing.

The remote computing device 120 wirelessly communicates with the imaging device 110 in real-time to obtain image data related points of interests within the image captured. The remote computing device 120 can also retrieve historical data to be used to obtain the points of interest. The wireless communication can be performed in a cloud environment 60, or over wireless networks as mentioned above. The remote computing device 120 can be a web server or physical computing device housed in a remote location such as a control room within a parking authority.

The remote computing device 120 is in communication with the storage 130 for storing image data received from the imaging device 110 and for storing parking information and control instructions for operating the system 100. According to an embodiment of the present invention, the remote computing device 120 can include a centralized server or distributed cloud computing can be utilized to perform the remote image processing for object detection.

The remote computing device 120 further communicates with a satellite imagery system 125 to retrieve satellite images associated with the areas to be monitored by the imaging device 110, for further processing.

According to an embodiment of the present invention, the remote computing device 120 and the storage 130 can be a part of the cloud environment 60 or located together or separately in remote location(s).

The system 100 includes the software module application 140, accessible via a user device 150 to access the remote computing device 120, to control the system 100, and to display image data thereon. A user accesses the software module application 140 via inputs of the user device 150 and controls operation using the software module application 140.

An example of operation of the system 100 will now be discussed below with reference to FIGS. 3A and 3B.

An example of an image 300 captured by the imaging device 110 can be found in FIG. 3A. As shown, the image 300 is captured at an angle and processed locally via the processor 114 or at the remote computing device 120 using image analytics. Upon processing, four (4) points of interest, 300a, 300b, 300c and 300d are detected within the image 300.

The remote computing device 120 further retrieves a satellite view from the satellite imagery system 125 (as depicted in FIG. 2) of the same area shown in the image 300 captured by the imaging device 110 (as depicted in FIG. 3B). The image 350 is a geographically mapped aerial view of the same area as provided by, for example, a maps application programmable interface (API) (e.g., Google® maps). In this example, at the scale of the images 300 and 350, the ground plane is assumed to be flat, and the geo-coordinate system is assumed to be orthogonal.

Four (4) points of interest 350a, 350b, 350c and 350d are found in the image 350 corresponding to the four (4) points of interest 300a, 300b, 300c and 300d of the image 300 in FIG. 3A. These points of interests 300a-300d and 350a-350d on the ground plane in the field of view of both images 300 and 350 are identified by visual inspection via a software module application accessed by the user at the user device 150 and sent to the remote computing device 120. Each point of interest desirably matches a corresponding point of interest in both images 300 and 350. Alternatively, according to other embodiments, the points of interests 300a-300d and 350a-350d could be identified in both images 300 and 350 by an automated process for example, by using a stitching technique.

For example, point of interest 300a in image 300 (depicted in FIG. 3A) needs to match corresponding point of interest 350a in image 350 (depicted in FIG. 3B) and so on. An exemplary software instruction 440 of the remote computing device 120 is accessible by the software module application 140 at the user device 150 and used to manually manipulate the four points of interest 300a-300d and 350a-350d as corners of a polygon 310, 360, for example, superimposed over the images 300 and 350. The present invention, however, is not limited to the points of interests being manipulating into any particular shape and can vary as necessary.

According to one embodiment, the edges of each polygon 310, 360 can be color-coded to clearly indicate the corresponding points of interests. This allows for the positioning of points to be true visible points of interest (e.g., a corner being yellow color) or for aligning edges, creating a virtual point indicating the intersection of two straight lines (e.g., a curb). The polygons 310 and 360 can be formed by dragging the corners via a pointing device at the user device 150.

Upon obtaining the points of interests 300a-300d and 350a-350d, a homography matrix can be calculated via the software module application 140 and sent back to the remote computing device 120, for future use. As long as the perspective of the imaging device 110 remains stationary, any image pixel identified by a human viewer or via the image analytics software, representing a point of interest on the ground plane can be transformed to and reported by its corresponding geocoordinate.

In one embodiment, each point of interests 300a-300d and 350a-350d are represented as a three-valued vector, where the points of interest 350a-350d from the satellite view are represented as g=[latitude, longitude, 1], while the points of interests 300a-300d from the imaging device 110 are represented as c=[x, y, 1]. The homography transform matrix is a 3×3 matrix (H) such that:

g*H=k*c, where k is a normalization scalar.

The present invention is not limited by order, orientation, scaling and references of the mathematical representation may differ when necessary.

Once the homography matrix is determined, the pixel coordinates (c) of the image 300 can be converted to latitude and longitude coordinates at the remote computing device 120, and the image 300 from the imaging device 110 can be transformed to a top-down image to be superimposed on top of the image 350 from the satellite view, instead of the angled view of image 300 as depicted in FIG. 3A. According to another embodiment, the homography matrix can be sent directly to the lighting fixture from the remote computing device 120, to perform the image transformation locally to a top/down view, and to calculate vehicle velocity, for example in real-time.

Further details regarding the remote computing device 120 as shown in FIGS. 1 and 2 will now be discussed with reference to FIG. 4.

Figure 4:
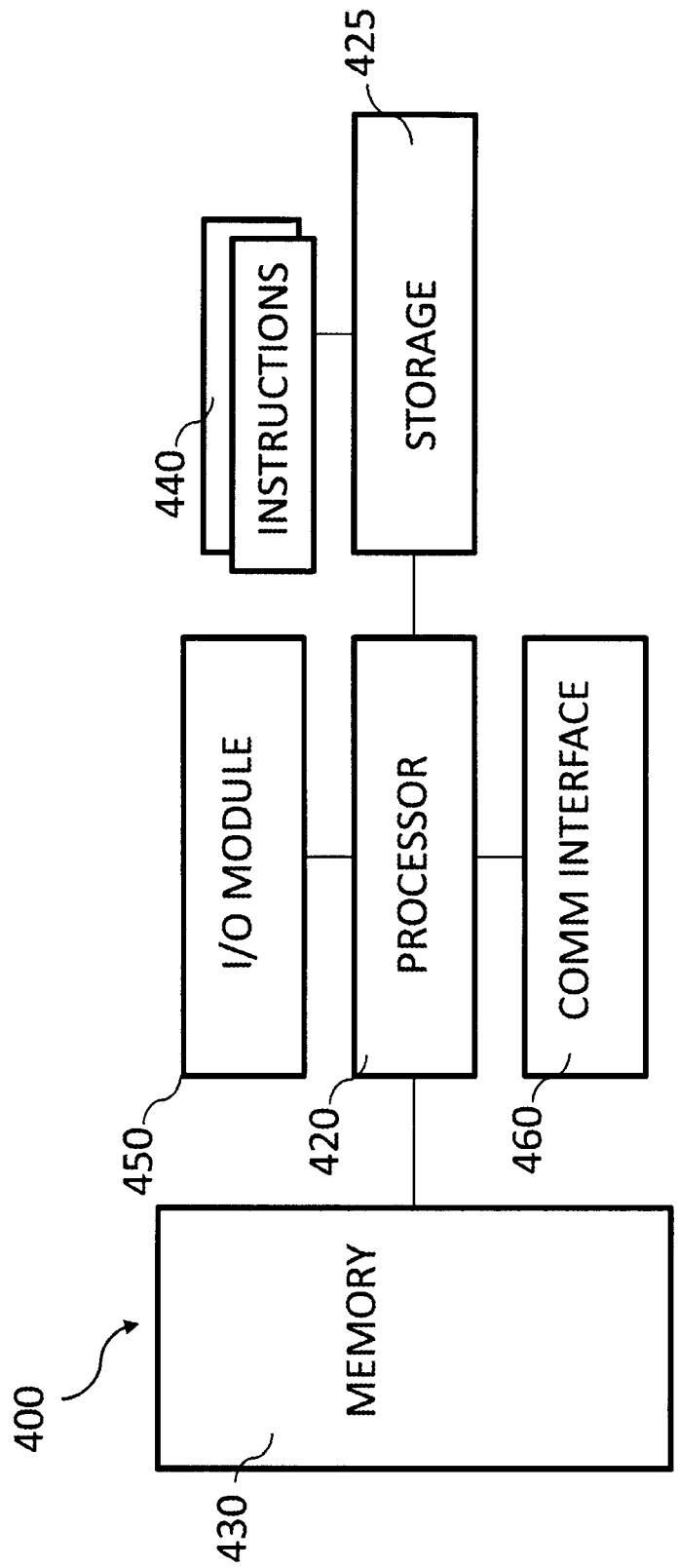
FIG. 4 is a block diagram illustrating an example of the remote computing device of FIG. 1 that can be implemented within one or more embodiments of the present invention.

In FIG. 4, the remote computing device 120 according to embodiments of the present invention is provided. The remote computing device 120 can be a computing device 400 that includes a processor 420 with a specific structure. The specific structure is imparted to the processor 420 by instructions stored in an internal memory 430 included therein. The structure can also be imparted by instructions 440 that can be fetched by the processor 420 from a storage medium 425. The storage medium 425 may be co-located with the system 400 as shown, or it may be located elsewhere and be communicatively coupled to the system 200, similar to the storage 130 shown in FIG. 1.

The system 400 may include one or more hardware and/or software components configured to fetch, decode, execute, store, analyze, distribute, evaluate, diagnose, and/or categorize information. Furthermore, the system 400 can include an (input/output) I/O module 450 that can be configured to interface with a plurality of remote devices including imaging devices (e.g., imaging device 110) and sensors. The system 400 is calibrated during installation so that operation of imaging devices and sensor detection corresponds to a known physical location (e.g., geo-location on a map).

The processor 420 may include one or more processing devices or cores (not shown). In some embodiments, the processor 420 can be a plurality of processors, each having either one or more cores. The processor 420 can be configured to execute instructions fetched from the memory 430, or the instructions may be fetched from storage medium 425, or from a remote device connected to computing device via a communication interface 460.

Furthermore, without loss of generality, the storage medium 425 and/or the memory 430 may include a volatile or non-volatile, magnetic, semiconductor, tape, optical, removable, non-removable, read-only, random-access, or any type of non-transitory computer-readable computer medium. The storage medium 425 and/or the memory 430 may include programs and/or other information that may be used by the processor 420.

Moreover, the storage medium 430 may be configured to log data processed, recorded, or collected during the operation of the computing device 400. For example, the storage medium 425 may store historical patterns of the data captured by the imaging device 110. The data may be time-stamped, location-stamped, cataloged, indexed, or organized in a variety of ways consistent with data storage practice.

Figure 5:
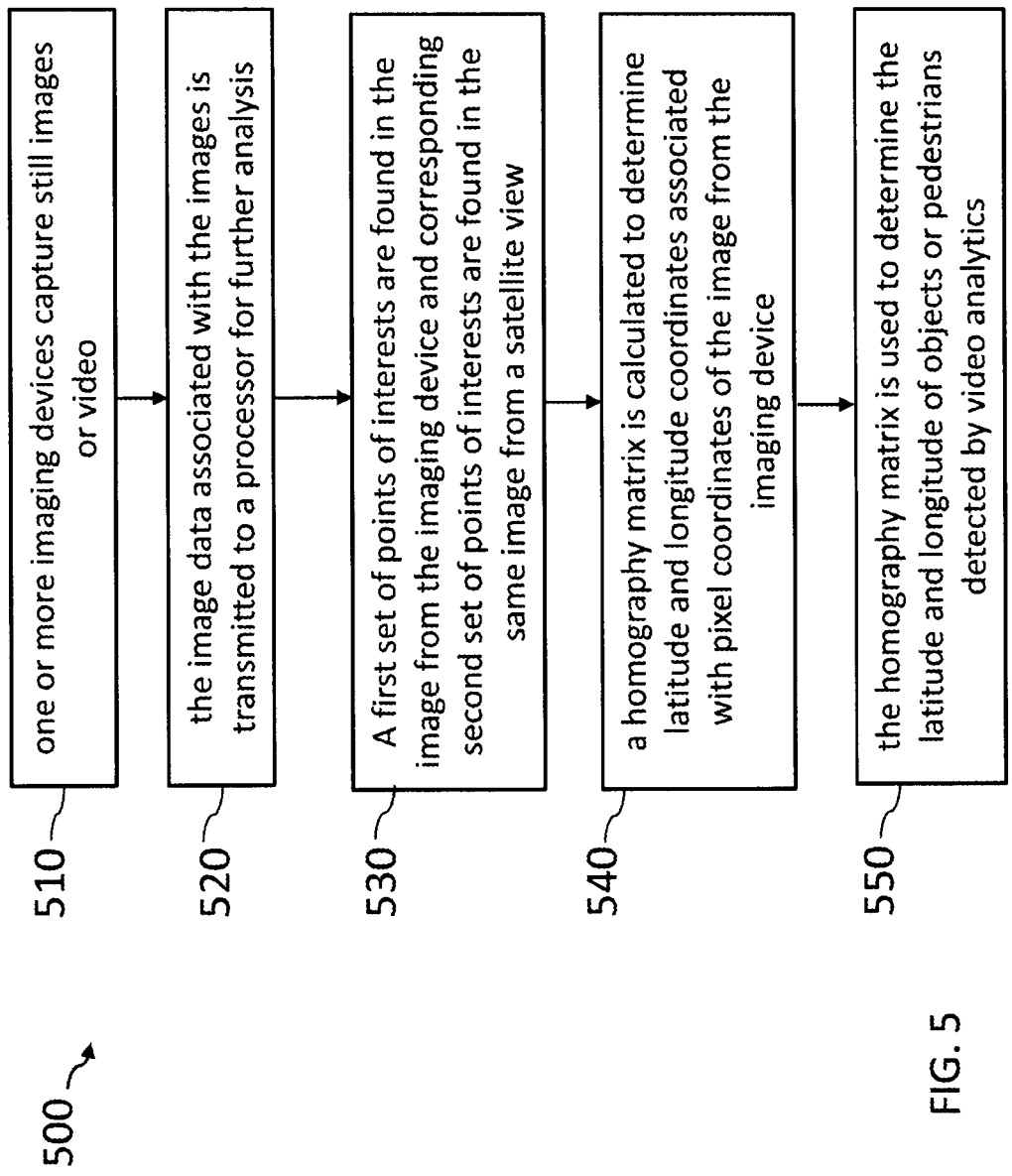
FIG. 5 is a flow diagram illustrating a method to perform a comparison operation of images from an image device to images of a satellite imagery system to calculate a homography matrix using the above-identified system as shown in FIGS. 1 and 2, that can be implemented within one or more embodiments of the present invention.

FIG. 5 is a flow diagram illustrating a method 500 for performing a comparison operation of images captured from an imaging device at a lighting fixture, to images of a satellite imagery system to calculate a homography matrix using the above-identified system. The method 500 can be implemented within various types of systems for example, traffic or pedestrian systems, and parking systems.

The method 500 begins at operation 510 where one or more imaging devices capture video segments and still images. Video or individual image frames from the video segments can be obtained by timestamp for download from a remote location. The video segments can be for a predetermined period of time (e.g., 5, 10, or 30 minute segments). From operation 510, the process continues to operation 520 where the image data associated with the images is transmitted to a processor for further analysis. According to one or more embodiments, the processor can be located within the lighting fixture or in the remote computing device, or other devices or equipment of a system.

The process then continues to operation 530, where a first set of points of interests are found in the image from the imaging device and corresponding second set of points of interests are found in an image of the same area from a satellite view by a user via a software module application accessed at a user device.

Then in operation 540, based on the results of the comparison operation in operation 530, a homography matrix is calculated via the software module application, to determine latitude and longitude coordinates associated with pixel coordinates of the image from the imaging device.

According to this embodiment, upon calculating the homography matrix, the image from the imaging device can be transformed to a top-down view, and a user at the user device can obtain latitude and longitude coordinates associated with the image captured by the imaging device, and the image displayed at the user device is a top-down view instead of the angled view of the image captured at the imaging device.

According to an embodiment, at operation 550, the homography matrix is further used to determine the latitude and longitude of objects and pedestrians detected by video analytics.

Embodiments of the present invention provide the advantages of determining latitude and longitude coordinates of an image captured at an imaging device within a lighting fixture by determining a homography matrix using corresponding points of interests of the image and matching points of interests of a same image from a satellite view.

This written description uses examples to disclose the invention including the best mode, and also to enable any person skilled in the art to practice the invention, including making and using any devices or apparatuses and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
an imaging device configured to capture image data of a monitored area; and
a computing device having at least one processor configured to:
receive first image data from the imaging device;
receive second image data from a satellite imagery system, the second image data relating to the monitored area;
determine a first set of points of interest in the first image data, wherein members of the first set of points of interest are represented as a first vector, c;
determine a second set of points of interest in the second image data, wherein members of the second set of points of interest are represented as a second vector, g;
generate a homography matrix, H, in accordance with the following equation: g*H=k*c, where k is a normalization scalar; and
determine, using the homography matrix, latitude and longitude coordinates of at least one object represented in the first image data but not the second image data.

2. The system of claim 1, wherein the first vector represents a pixel coordinate and the second vector represents a geocoordinate.

3. The system of claim 1, wherein the first vector takes the form c=[x, y, 1], the second vector takes the form g=[latitude, longitude, 1], and the homography matrix is a three-by-three matrix.

4. The system of claim 1, wherein a quantity of points of interest in the first set of points of interest is equal to a quantity of points of interest in the second set of points of interest.

5. The system of claim 4, wherein the quantity of points of interest in the first set of points of interest is at least four.

6. The system of claim 1, wherein the at least one object includes at least one of a vehicle and a pedestrian.

7. The system of claim 1, wherein the first set of points of interest and the second set of points of interest include one or more of an intersection of two straight lines and a corner of an object that is represented in the first image data and the second image data.

8. The system of claim 1, wherein the computing device is a cloud-based computing device.

9. The system of claim 1, wherein the computing device is integrated with the imaging device.

10. The system of claim 1, wherein the processor is further configured to:
determine, using the homography matrix, a velocity of the at least one object.

11. The system of claim 1, wherein the processor is further configured to:
transform, using the homography matrix, an image captured by the imaging device into a top-down view that includes a representation of the at least one object.

12. A method performed by a computing device, the method comprising:
receiving, from an imaging device, first image data of an area monitored by the imaging device;
receiving, from a satellite imagery system, second image data relating to the area monitored by the imaging device;
determining a first set of points of interest in the first image data, wherein members of the first set of points of interest are represented as a first vector, c;
determining a second set of points of interest in the second image data, wherein members of the second set of points of interest are represented as a second vector, g;
generating a homography matrix, H, in accordance with the following equation: g*H=k*c, where k is a normalization scalar; and
determining, using the homography matrix, latitude and longitude coordinates of at least one object represented in the first image data but not the second image data.

13. The method of claim 12, wherein a quantity of points of interest in the first set of points of interest is equal to a quantity of points of interest in the second set of points of interest.

14. The method of claim 13, wherein the quantity of points of interest in the first set of points of interest is at least four.

15. The method of claim 12, wherein the first set of points of interest and the second set of points of interest include one or more of an intersection of two straight lines and a corner of an object that is represented in the first image data and the second image data.

16. The method of claim 12, further comprising:
transforming, using the homography matrix, an image captured by the imaging device into a top-down view that includes a representation of the at least one object.

17. The method of claim 12, further comprising:
manipulating the first set of points of interest and the second set of points of interest into a specific shape.

18. The method of claim 12, further comprising:
determining, using the homography matrix, a velocity of the at least one object.

19. The method of claim 12, wherein the first vector represents a pixel coordinate and the second vector represents a geocoordinate.

20. The method of claim 12, wherein the first vector takes the form c=[x, y, 1], the second vector takes the form g=[latitude, longitude, 1], and the homography matrix is a three-by-three matrix.

* * * * *